United States Patent [19]

Schultz et al.

[11] 4,052,913
[45] Oct. 11, 1977

[54] POLAR WEAVE FLYWHEEL ASSEMBLY

[75] Inventors: Frederick E. Schultz, Devon; Albert M. Garber, Wynnewood, both of Pa.

[73] Assignee: General Electric Company

[21] Appl. No.: 643,906

[22] Filed: Dec. 23, 1975

[51] Int. Cl.² .......................... G05G 1/00; G05G 3/00
[52] U.S. Cl. ........................................................ 74/572
[58] Field of Search ............................................ 74/572

[56] References Cited

U.S. PATENT DOCUMENTS

| 3,692,607 | 9/1972 | Shubert | 432/72 |
| 3,713,932 | 1/1973 | Butzow et al. | 156/173 |
| 3,719,212 | 3/1973 | Emerson | 139/389 |

OTHER PUBLICATIONS

"Strongest Synthetic Fiber Yet Fills a Host of Design Needs," Product Engineering, p. 49, (Sept. 1974).

Primary Examiner—Leonard H. Gerin
Attorney, Agent, or Firm—James W. Johnson, Jr.

[57] ABSTRACT

A polar weave (i.e., three-dimensional, reinforced, composite material) flywheel, assembly comprises an outer polar weave portion and an integral metal hub. The hub includes a plurality of recessions and projections to provide an interface between the outer portion and the hub. The outer portion has a cylindrical configuration and is composed of woven and bonded unidirectional high-strength elements aligned and positioned in directions parallel to the polar coordinate axes. The elements so aligned are mechanically imbedded and locked into woven engagement with the recessions and projections, through which the woven outer portion becomes an integral part of the hub, and the interface is inherently strong enough to withstand failure caused by internal and external forces associated with operation of the assembly. The elements aligned and woven within the woven outer portion and onto the hub reinforces the assembly by providing the desired degree of strength and stiffness in directions of the polar coordinate axes, and prevents delamination from occurring in directions along the polar coordinate axes and in directions of the above acting forces. Reinforcement of the assembly also allows internal stresses to be controlled and optimized throughout the assembly when the assembly is subjected to the internal and external forces.

17 Claims, 9 Drawing Figures

POLAR WEAVE FLYWHEEL ASSEMBLY

CROSS REFERENCE TO RELATED APPLICATION

Co-pending application, "Method and Device for Orthogonally Woven Reinforced Structure," Application Ser. No. 430,758, F. E. Schultz (Jan. 1974), describes a polar weave material of the type employed in the flywheel of the present invention.

BACKGROUND OF THE INVENTION

1. Field of the Invention

This invention pertains to a flywheel assembly particularly adapted for energy storage applications, and more particularly pertains to construction of a three-dimensional, reinforced, composite, material, flywheel, outer portion and a hub with an interface for mechanically locking the hub and outer portion to one another.

2. Description of the Prior Art

Recently, interest in flywheels has been revived because flywheels can help solve contemporary problems of crucial importance. For example, three special areas where flywheels can help concern: (a) problems relating to an expanding use of energy; (b) problems relating to an impact of that use on the environment; and (c) problems relating to more efficient use of energy.

With respect to the solution of the above problems, flywheels offer the prospects of providing energy storage systems for use with: solar energy systems, mechanical power systems, and electrical power systems. Flywheels, for instance, may provide an efficient means of storing energy on a large scale to help electric utilities handle peak loads. Additionally, flywheels may store energy for both propulsion and auxiliary power of: air, land, sea and space vehicles (such as: trains, automobiles, trucks, buses, submarines, airplanes and space vehicles). Moreover, flywheels may provide compact units to power the above vehicles.

However, until recently, the use of prior art flywheels has been limited to a very few applications because of the following principal disadvantages. For example, prior art flywheels cannot store sufficient amounts of energy within practical weight and volume constraints. Further, high speed composite wheels are subject to delamination, and have inefficient geometric configurations and certain structural dynamic limitations.

The extent or seriousness of these disadvantages are essentially determined by three important characteristics of flywheels. Namely, the materials comprising the flywheel, the geometric configuration of the flywheel, and in the case of filament would composites, the method of fabricating the flywheel.

This is so because flywheels operate in accordance with the following principles: First, the maximum amount of energy stored in a flywheel depends on: the mass of the flywheel, the distribution of the mass, and the maximum allowable rotational speed of the flywheel. Second, stored energy varies as the square of the rotational speed of the flywheel. And third, the maximum rotational speed is limited by the strength of the material of the flywheel. Hence, it follows that high strength to weight ratio is a key criteria for selecting material to fabricate high performance energy storing flywheels.

However, prior art flywheels have been traditionally made from materials which do not satisfactorily meet the above criteria, therefore they suffer the above named disadvantages. For example, high performance metal flywheels (even those made of the strongest alloyed steel) are generally unsatisfactory, notwithstanding their great strength, because most metal flywheels possess large densities of around 8 grams per cubic centimeters. These densities cause the metal flywheels to have a very large weight and volume in order to store sufficient energy. Additionally, utilization of metal flywheels at high stress levels increases the hazards of catastrophic failure because of a great increase of energy of failed pieces. Thus, as a consequence of the foregoing, metal flywheels will usually be limited to applications where either adequate failure protection can be provided, or where performance can be derated sufficiently to provide an adequate margin of safety.

Similarly, state of the art flywheels composed of typical reinforced composite materials or two-dimensional reinforced plastic materials, such as filament would composite assemblies, are inadequate due to the low strength characteristics of the material in directions perpendicular to unidirectional fibers within the composite. Radial loads occur in directions perpendicular to the unidirectional fibers impose tensile loads on the resin matrix material. The resin, which is usually an epoxy resin, is very poor in withstanding these tensile loads. Thus, rotational loads cause delaminations at speeds below the limits set by the high tensile strength to weight ratio of the filament wound composite materials. Consequently, filament would composite flywheel assemblies have yet to demonstrate the potential illustrated by the high strength to weight ratio of the composite material.

In an attempt to alleviate the problem of delamination, several approaches have been ventured, such as the utilization of uniform rods and thin hoops in which it is attempted to achieve a one dimensional stress field. However, these approaches have tended to avoid delamination problems at a severe penalty with respect to the energy stored per pound of material, or energy stored per unit volume.

In addition to the above, radial, axial, and shear stresses often cause the rin, wheel, or outer portion of prior art composite flywheels to separate from the hub. This occurs because the bonded interface between the outer portion and the hub is not strong enough to accommodate radial, axial and shear stresses experienced in operational conditions without failure.

Lastly, designers are severely limited in their ability to alter and tailor stress distributions when using flywheels constructed from typical reinforced isotropic composite materials. For, in the case of isotropic materials, the stresses in a rotating flywheel of uniform thickness are dependent primarily on one material parameter, that is density. Plus, the stresses vary non-linearly with radius. Thus, in designing an isotropic flywheel of uniform thickness, the designer must establish an allowable speed based on not exceeding the allowable maximum stress, which maximum stress is a tangentail stress located at the inner edge of the wheel. Consequently, isotropic composite materials comprising a flywheel of uniform thickness are under utilized. Designers, in an attempt to make more effective use of the isotropic composite materials, vary the thickness of the flywheel, and proportion the flywheel so that the stresses are equal at every point in the flywheel. However, in filament wound isotropic composite assemblies, once the fibers and matrix materials are specified, the degree of tailorability of stress distributions is frozen.

Thus, it is an object of this invention to provide a composite flywheel wherein the various reinforcement elements (radial, circumferential, and axial) may be selected to design to provide, within a broad spectrum of possible variations, optimum levels of strength, stiffness, and density of provide maximum energy storage capability for the woven outer portion.

It is another object of this invention to provide a polar weave flywheel assembly that is capable of efficiently storing an amount of energy for a given weight and volume without failure, heretofore not possible in prior art flywheel assemblies.

It is also an object of this invention to provide a polar weave flywheel assembly having a hub-outer portion interface of enough strength to withstand failure due to external and internal forces associated with operation of the assembly.

It is still an object of this invention to provide a polar weave flywheel assembly with improved margins of safety for catastrophic failure and delamination.

SUMMARY OF THE INVENTION

A polar weave (i.e., a three-dimensional, reinforced, composite material) flywheel assembly includes a redundant, adhesive, mechanical, interlocked, interface between a metal hub and an outer, cylindrical, polar weave portion of the assembly. The interface comprises a multiplicity of projections and recessions uniquely positioned about the hub to receive high-strength, unidirectional axial and radial elements that are aligned in directions parallel to the Z and R polar coordinate axes, and to receive high-strength, unidirectional circumferential elements whose tangents at any given point are normal to the Z and R axes. The elements respectively aligned in the radial, axial and circumferential directions are called radial, axial and circumferential elements. The recessions positioned about the hub comprise a plurality of both circular and axial slots machined into the hub's surface. The projections comprise a plurality of lands positioned between the circular and axial slots. Different ones of the radial, axial and circumferential elements are sequentially meshed and embedded into locking engagement with the circular and axial slots; by which, the interface is afforded enough strength to withstand failure when subjected to external and internal forces associated with operation of the assembly, and the outer portion is enabled to become an integral part of the outer polar weave portion.

To form the interface, the radial elements are positioned directly onto the hub by drawing, locking and embedding the radial elements into the circular slots with a first layer of circumferential elements in alignment with the lands. The first layer of circumferential elements are then wrapped around the radial elements until a top surface of the circumferential elements reach a base of the axial slots. Axial elements are added and embedded in the axial slots until the axial slots are full. And, lastly, additional circumferential elements are added to secure and lock the preceding axial elements in the axial slots, thereby completing the interface.

The cylindrical outer portion is completed by sequentially adding and weaving additional and successive layers of axial, circumferential and radial elements. The elements reinforce the assembly by providing strength, stiffness, and mass in the axial, circumferential and radial directions. A desired level of strength, stiffness and density is obtained throughout the outer portion in any desired direction of the polar coordinate oriented elements by varying the quantity, size, and type of elements as a function of direction and radius.

BRIEF DESCRIPTION OF THE INVENTION

DETAILED DESCRIPTION OF THE INVENTION

Viewing FIGS. 1 through 7, the flywheel assembly generally shown at 1 comprises an inner hub, core, or shaft 2, for fabricating an outer cylindrical polar weave portion 3 thereon. Hub 2 is of a generally cylindrical, or tubular shape and is preferably manufactured from metal materials. Hub 1 includes a plurality of projections and recessions uniquely positioned to receive various ones of axial, circumferential and radial elements 7, 9 and 11 of woven outer portion 3 therein, as seen most clearly in FIG. 4 and in FIG. 2 in hub's 2 exterior surface 5.

Figure 1:
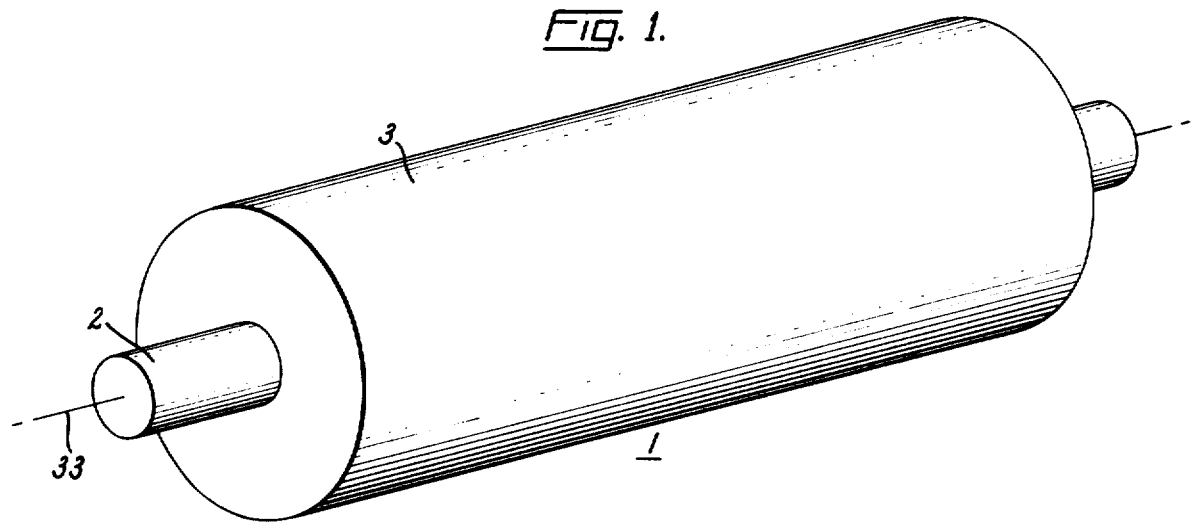
FIG. 1 illustrates schematically a polar weave flywheel assembly in accordance with the principles of this invention.
Figure 2:
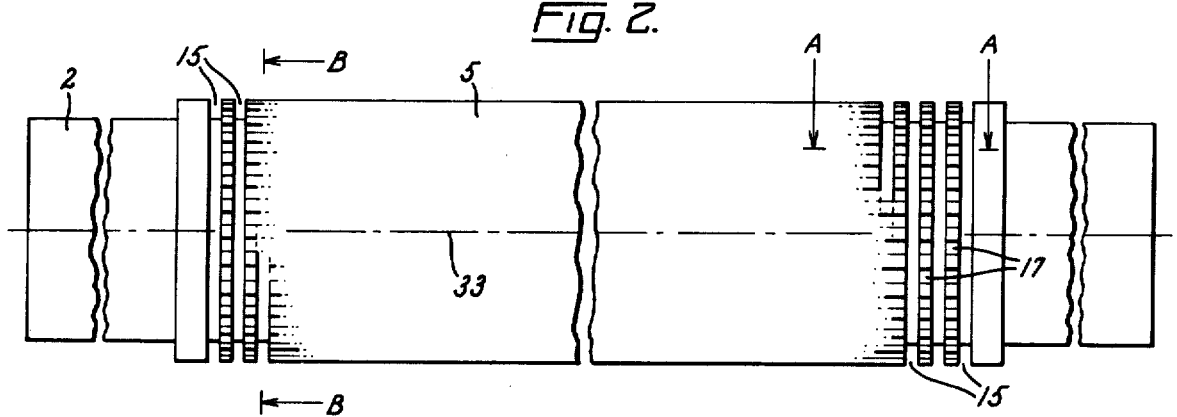
FIG. 2 is a detailed side view of a hub for the polar weave flywheel assembly of FIG. 1 illustrating the circumferential and axial slots.
Figure 3:
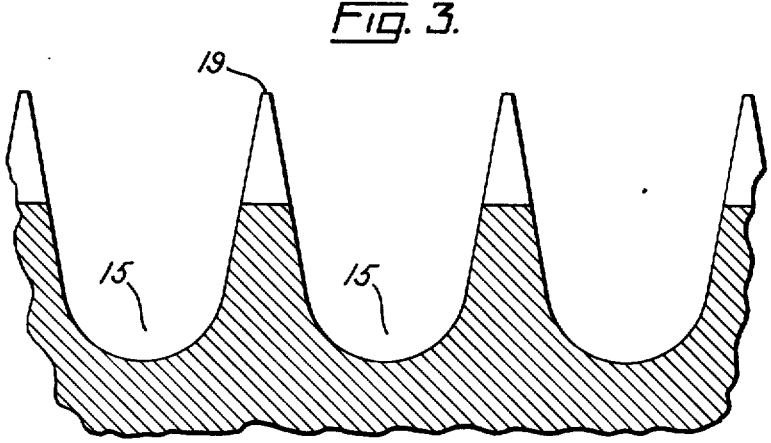
FIG. 3 is a detailed side view in section of the hub of FIG. 2 taken along line A—A illustrating the circumferential slots.
Figure 4:
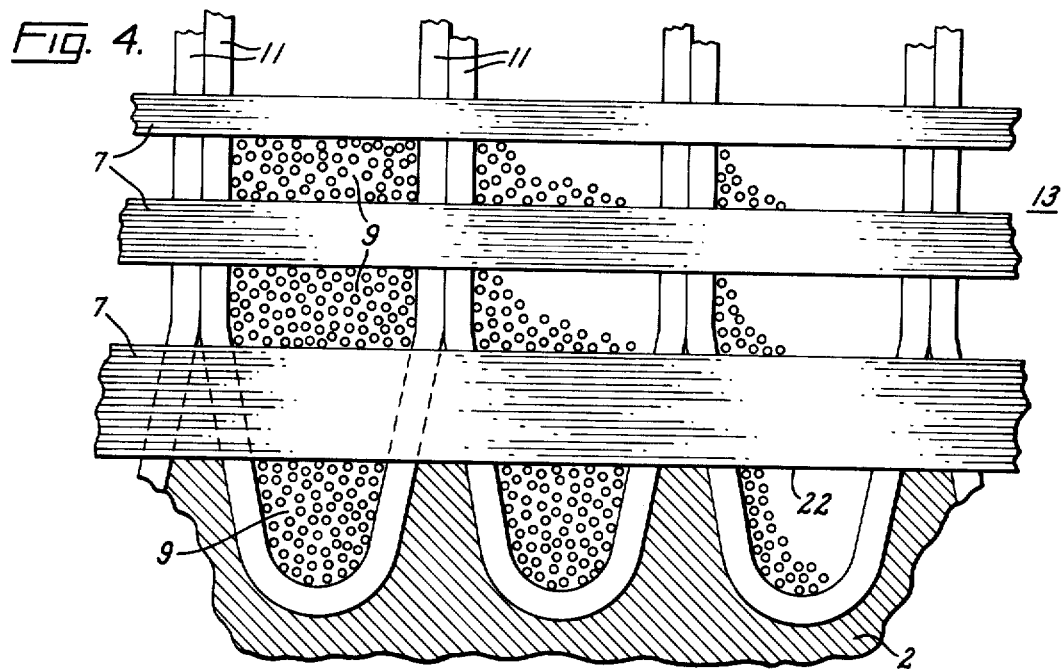
FIG. 4 is a detailed side view similar to FIG. 2 but including axial, radial and circumferential elements for a polar weave system intermeshed with the circumferential slots.
Figure 5:
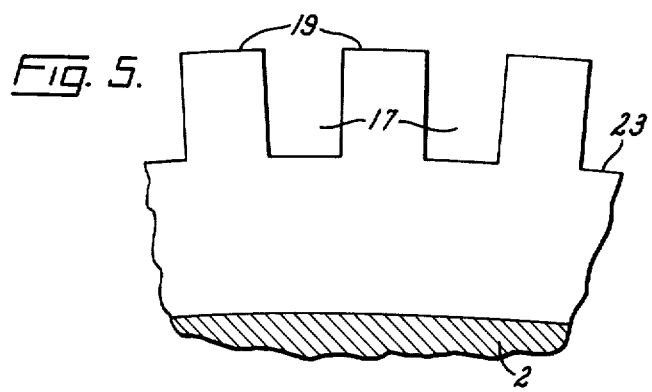
FIG. 5 is a detailed end view in section of the hub of FIG. 1 taken along line B—B illustrating axial slots and the depth of the circumferential slots.
Figure 6:
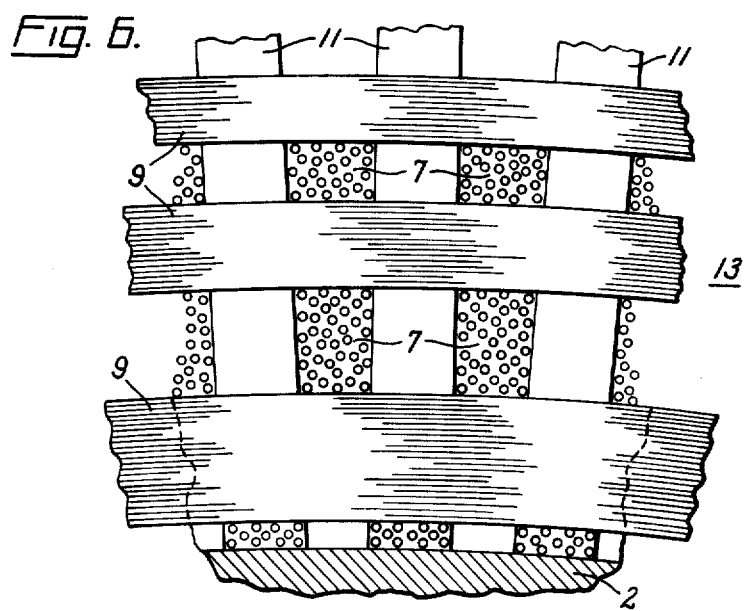
FIG. 6 is a detailed end view similar to FIG. 5 but including axial, radial and circumferential elements of a polar weave system intermeshed with the axial slots.

The multiplicity of recessions and projections function to create a redundant, adhesive, mechanical, interlocking, interface generally designated as 13 in FIGS. 4 and 6. Interface 13 is located between hub 2 and outer portion 3, and in general, functions to mechanically embed and lock windings of axial, circumferential and radial elements 7, 9 and 11 in engagement thereto. The recesses are of two types. Namely, circular slots 15 as shown most clearly in FIG. 3 and axial slots 17 as shown most clearly in FIG. 5.

Circular and axial slots 15 and 17 may be formed into hub 2 by conventional procedures such as: casting, rolling, milling, etc. In detail, circular slots 15 are axially spaced along hub 2, while axial slots 17 are uniquely positioned to lie parallel to an axis of hub 2 and intersect circular slots 15. Hence, axial slots 17 are formed directly into the surface areas or lands 19 that are associated with circular slots 15. The exact manner in which the axial and circular slots 17 and 15, lands 19, and axial, circumferential and radial elements 7, 9 and 11 will be spaced and arranged with respect to one another on any particular hub 2 is a function of a specific design. Or, said differently, the spacing and arrangement of the named elements is a design variable and depends on such factors as anticipated application and stress calculations with respect to yet other features; for instance, size, density and the physical properties of the materials employed. This will become clearer after reading latter sections of the specification.

Figure 7:
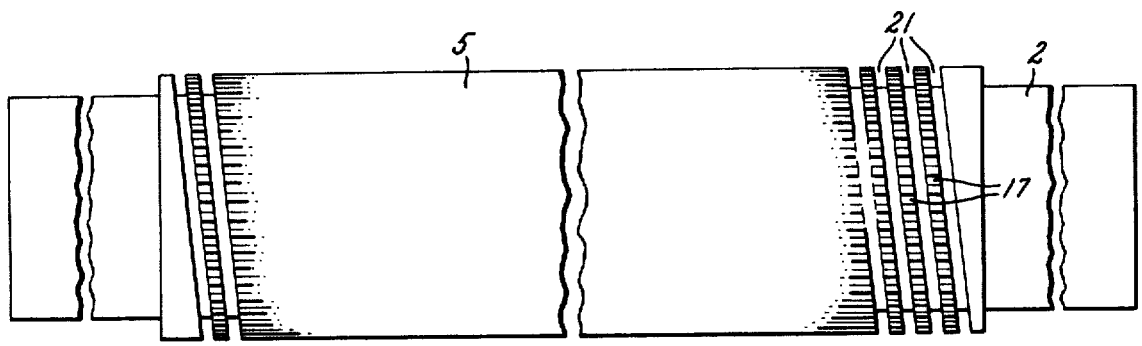
FIG. 7 is a detailed view similar to FIG. 2 of an alternate embodiment of the hub featuring helical slots.
Figure 8:
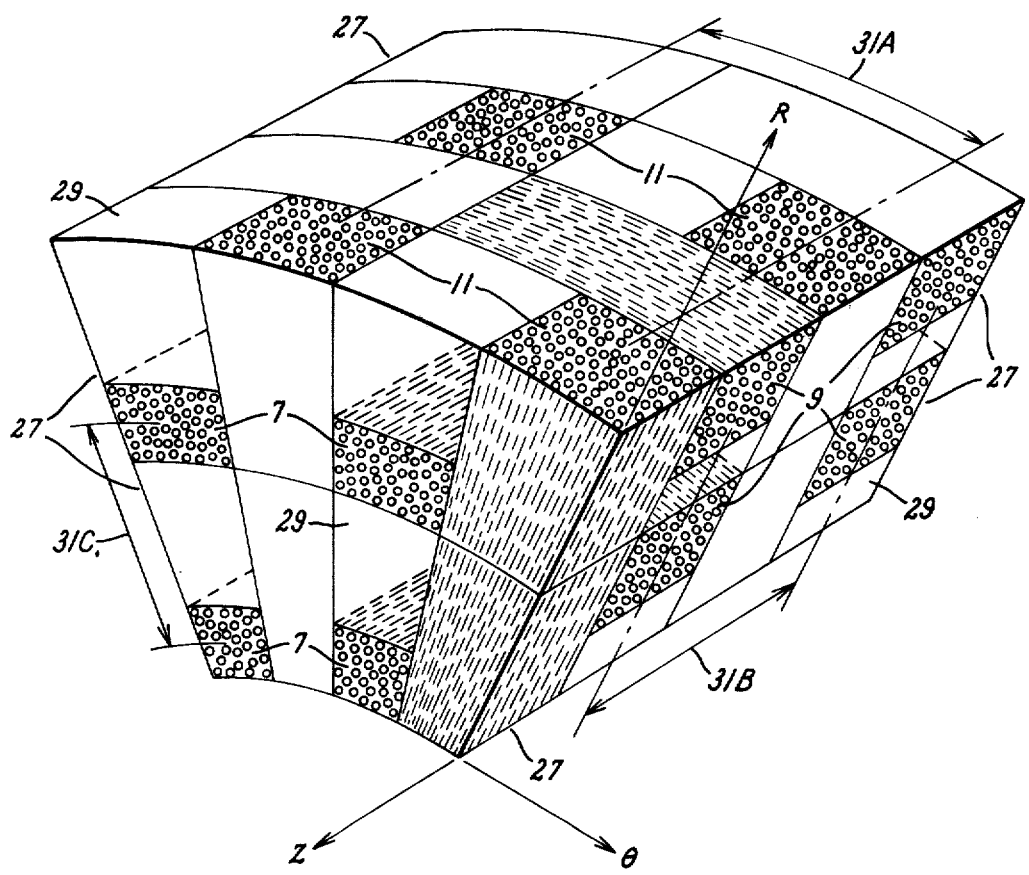
FIG. 8 is a detailed view of unit cells of a polar weave anisotropic composite material taken from the cylindrical outer polar weave portion of the polar weave flywheel assembly of FIG. 1.

In an alternate embodiment, helical slots 21 as indicated in FIG. 7 are used to replace circular slots 15. Helical slots 21 may be multiple pitched slots. Except for changing circular slots 15 to helical slots 21, all of the above discussed principles apply when employing helical slots 11. Co-pending application, Ser. No. 430,758, explains in detail the method and apparatus used to produce a polar weave composite material when a helix rather than circular slots 15 are employed to support the woven elements of the polar weave composite material.

In yet another embodiment, not here illustrated, the axial, circular and helical slots and lands may be fabricated by embedding rows of pegs, pins or equivalent devices into surface 5 of hub 2.

Hub's 2 interface 13, as previously mentioned, is created by embedding various one of the axial, circumferential and radial elements 7, 9 and 11 into circular and axial slots 15 and 17. First, radial elements 11 as shown most clearly in FIG. 4 are positioned, intermittently meshed, embedded, weaved and locked in and about hub 2, by drawing radial elements 11 into circular slots 5 with circumferential elements 9. A first layer of circumferential elements 9 are directly meshed, embedded and wrapped into circular slots 15, and woven over radial fibers 11 until a tip surface or height 22 of circumferential elements 9 reaches a base level 23 of axial slots 17 as shown most clearly in FIG. 5. Axial elements 7 are next directly meshed and embedded into axial slots 17 until axial slots 17 are filled as shown most clearly in FIG. 6. Circumferential elements 9 are added to secure, weave, and lock axial elements 7 in an axial position and in axial slots 17.

In the above manner, interface 13 is completed and functions as an integral hub-wheel (or outer portion) interface. Interface 13 also enables hub 2 to become an integral part of outer portion 3.

Additionally, interface 13 is of sufficient strength to withstand failure due to internal and external forces associated with operating of the polar weave flywheel assembly 1. Generally speaking, this is to because the multiplicity of lands 19 and circular and axial slots 15 and 17 (with the axial, circumferential, and radial elements 7, 9 and 11, intermittently meshed and embedded therein) create a superior bearing surface. That is, the sides and tops (or surface areas) of all the numerous lands 19 and axial and circular slots 17 and 15 of hub surface 5 forcefully bear against the surfaces of various layers of windings of axial, circumferential and radial elements 7, 9 and 11 embedded and woven thereto. The above three types of elements in turn forceably bear and mesh with one another at: interface 13, within the body of the polar weave outer portion 3, and at the lands 19 and circular and axial slots 15 and 17. Thus, interface 13 locks hub 2 to outer portion 3 and prevents relative motion between hub 2 and outer portion 3.

As a consequence of the geometric arrangement of interface 13, external and internal forces acting on assembly 1, which normally generate relative motion rotationally between the mating surface of hub 2 and outer portion 3, now generate interface forces between hub 2 and outer portion 3. The interface forces acting on these mating surfaces at interface 13, generated by the acting external and internal forces, enables loads or stresses to be uniformly transmitted to and from outer portion 3 to hub 2 via the multiplicity of projections and recessions machined over the entire surface 5 of hub 2. Hence, uniform transference and distribution of loads and stresses occur even though surface 5 of hub 2 and surfaces of outer portion 3 are not bonded or attached to each other by conventional type fasteners.

Therefore, in essence, the transfer of external and internal forces between hub 2 and outer portion 3 is independent of adhesive shear capability and composite bond strength between hub 2 and outer portion 3. Further, interface 13 avoids non-uniform loading that is typically present in state of the art hub-disc attachments utilizing adhesives, nuts, bolts and other equivalent fasteners. So too, obviously, it follows that interface 13 is able to accommodate without failure a much higher magnitude of torque, axial loads, and in general, all other specific loads, stresses, and forces (associated with external and internal forces) than conventional disc-hub methods of attachments.

Moreover, hub 2 is not limited to only providing an interface for polar weave flywheel assembly applications. As interface 13 is applicable to any disc-hub problem in which polar weave fiber composites are employed, and especially where high torque or axial loads are expected. The following incomplete list sets out outer disc-hub applications in which interface 13 is applicable: clutches, brakes, transmissions, turbines, and compressors.

Viewing FIGS. 1 through 8, outer portion 3 of assembly 1, in a preferred embodiment, has a cylindrical or tubular, parallel-sided configuration and comprises polar weave composite materials. Outer portion 3, however, is not limited to the above geometrical configuration, and may, for example, have non-parallel sides.

The polar weave composite material comprises a non-homogenous, anisotropic, elastic, material, system, and includes three types of bundles of mutually orthogonal classes of unidirectional, reinforcing, high-strength elements. The elements are designated as axial, radial, and circumferential elements 7, 9 and 11 because each class of elements are respectively aligned in axial, radial and circumferential positions or directions parallel to the R, Z and $\theta$ polar coordinate axes.

The inner axial, radial, and circumferential elements 7, 11 and 9 of outer portion 3, as previously explained, are directly embedded and woven into and about hub 1, while the remaining outer ones of the above three types of elements are sequentially added and woven in multiple layers about interface 13 until a desired configuration for outer portion 3 is obtained. The elements may be preimpregnated or impregnated after assembly, both options being accepted fiber composite practice. Outer portion 3 may be adhesively bonded to hub 2 at interface 13 if desired, although in some applications this may not be necessary.

With outer portion 3 constructed in the above fashion, hub 2 and outer portion 3, as earlier note, are an integral assembly. Accordingly, assembly 1 effectively functions as a single, integral cylinder. Similarly, in other embodiments, portion 3 may also be constructed so that assembly 1 functions as either several cylinders nestled within one another or functions as an assembly of radially tapered cylinders.

Construction of outer portion 3 is not limited to any specific type or kind of elements, and may be constructed from the following lists of various fibers and wires: graphite, kevlar, glass, silicon, boron, beryllium, tungsten, etc. and matrix or impregnate materials, such as: epoxy, polymide, phenolic, aluminum and titanium, etc.

Further, in addition to the above, outer portion 3 and hub 2 can be constructed and designed to do the following: provide a broad spectrum of stiffness and strength levels in each R, θ and Z polar coordinate axial direction, which R, θ and Z directions are the principal directions of acting forces in rotating flywheels; afford assembly 1 with a nearly uniform stress distribution in the R, θ and Z directions; and provide energy storage capacity not heretofore achievable with prior art metal reinforced composites or two-dimensional reinforced plastics. An examination of a unit cell 27, which cell 27 is the smallest distinguishable characteristic unit of the polar weave composite material system, explains the aforesaid.

Cell 27 includes the three bundles of axial, circumferential and radial classes of mutually orthogonal elements 7, 9 and 11. Bundles of elements in the circumferential position are circumferential elements 9, and at any given point their tangents are aligned and positioned normal to R and Z axes. The bundles of elements in the axial position are axial fibers 7 and are aligned positioned and extended to the Z axes. And bundles of elements in the radial position are radial fibers 11 and are aligned positioned and extended parallel to the R axes.

Cell 27 further includes interstitial spacing 29 between the constituent elements comprising the three classes of bundled elements. And cell 27 also includes axial, circumferential, and radial unit cell spacing 31B, 31A and 31C. Unit cell spacing 31A, 31B and 31C is the distance from center to center of adjacent bundles of similar elements in the θ, Z and R directions. As an illustration, radial spacing 31C is the distance from the center of one axial bundle to the center of an adjacent axial bundle in a radial direction. Axial spacing 31B is the distance between the centers of adjacent circumferential elements in the axial direction and circumferential spacing 31B is the spacing between center of adjacent, radial elements in the circumferential direction. The size or dimensions of cell 27 is a design variable, but in general, the dimensions 31A, 31B and 31C will be in the order of one tenth of an inch.

As previously noted, the polar weave composite material of units cells 27 of outer portion 3 comprises a non-homogenous anisotropic elastic material system. The polar weave composite material is an anisotropic material because strength, stiffness, density and shape material parameters are not the same in each R, θ and Z coordinate direction, and they may be varied as a function of the radius of assembly 1. In effect, the non-homogenous anisotropic property characteristics (or anisotropy) of assembly 1 is a function of the named parameters. This is in contrast to an isotropic engineering material such as aluminum because its material parameters are the same in all coordinate directions. Consequently, stresses developing in an aluminum constructed flywheel are dependent primarily on one material parameter, the density.

The anisotropy of a cell 27 to a great degree depends on the following physical proportions and material characteristics: relative volumes of each three classes of mutually orthogonal bundle of elements therein; the total volume of each unit cell 27; the type of element and matrix materials used to construct cell 27; and the type of weave employed.

Because of the anisotropy of unit cell 27, stress distributions can be altered or tailored in assembly 1 by controlling unit cell and element bundle array compliance as a predetermined function of radius. Additionally, anisotropy of assembly 1 can be varied even when element and matrix materials are specified or predetermined. Unit cell and element bundle array compliance are determined by providing unit cell 27 with desired physical proportions and material characteristics, and by providing the three arrays of bundled elements 7, 9 and 11 with a desired arrangement for handling developed stresses (i.e., the ratios of the axial, circumferential and radial compliances with respect to one another and with respect to the radius) for a particular design application. Compliance is in general satisfactory when assembly 1 is provided with the following: adequate strength, stiffness, and density levels to both accommodate forces acting in directions of the polar axes, and to prevent delamination from occuring in directions of the acting forces and polar axes. Likewise, internal stresses are tailored so they are optimized and controlled throughout assembly 1.

However, the ability to provide unit cell 27 with the desired proportions, and bundled elements 7, 9 and 11 with a desired arrangement, is in turn controlled by the anisotropy of unit cell 27. Accordingly, in view of the novel concepts enumerated above, the degree of tailorability of stress distributions depends on a particular design. Similarly, the exact shape and size of assembly 1 is also a design variable. So too, obviously a principal factor in designing assembly 1 is optimization of unit cell and element bundle array compliance for a particular design.

The following example exemplifies the above discussed new and novel principles of our invention—How the three classes of elements are arranged about the hub 2—And how the three classes of elements relate to one another and to interface 13. In this example, hub 2 has a diameter of 2.28 inches. The desired axial and circumferential spacing 31B and 31A from center to center of the bundles of radial elements 11 in adjacent cell 27 is 0.1 inches at the periphery of outer portion 3, when assembly 1 has a desired diameter of 18.3 inches. Minimum variation in circumferential spacing 31A is wanted to control the anisotropic characteristics of this example. Hub 2 utilizes circular type slots 15 instead of helical type slots 21.

Under the above conditions, all radial elements 11 are positioned and supported in planes perpendicular to the longitudinal axis 33 of hub 2. The radial planes are also aligned axially with lands 19 between circular slots 15, and in accordance with the above desired axial spacing 31B, are also spaced 0.1 inches apart center to center in axial direction Z. From this, it follows that the axial dimensions or thickness of assembly 1 determines the number of radial planes required. Hence, a 3 inch thick assembly 1 would require approximately 30 radial planes and approximately 31 circumferential slots 15 in hub 2.

Similarly, with respect to radial elements 11, the arrangement or pattern of radial elements 11 in any given radial plane, is identical to the arrangement of radial elements in other radial planes. Radial elements 11 are also aligned in axial direction Z. Thus, when 144 radial elements 11 are employed in each radial plane, circumferential spacing 31A will be 0.055 inches at the surface of hub 2 when the diameter is 2.28 inches.

The number of axial slots 17 required is the same as the number of radial elements 11 in a radial plane at the 2.28 inch diameter. In this example, 144 axial slots are required. The size or proportions of axial slots 15 and lands 19 within the 0.055 inch circumferential spacing 31A is a matter of design selection.

As weaving of interface 13 and outer portion 3 progresses by the sequential addition of layers of axial and circumferential elements 7 and 9, the diameter of outer portion 3 increases and circumferential spacing 31A between radial elements 11 increases. When the diameter of assembly 1 has increased to 4.57 inches, circumferential spacing 31A has increased to 0.1 inches. At this 4.57 inch diameter, 144 new radial elements 11 will be added between the original 144 radial elements utilized in each plane to reduce circumferential spacing 31A between radial elements 11 to 0.05 inches. Next, axial and circumferential layers of elements 7 and 9 are added until a diameter of outer portion 3 has increased to 9.15 inches, and the center to center circumferential spacing 31A is 0.1 inches. At this 9.15 inch diameter, 288 more radial elements 11 are added to double the number of radial elements 11 and again reduce the circumferential spacing to 0.05. Following the above, continued addition of axial and circumferential layers of elements 7 and 9 increase the size of outer portion 3 to the desired diameter of 18.3 inches with a resulting center to center circumferential spacing 31A between bundles of radial elements 11 of 0.01 inches.

In the example discussed, the dimensions, arrangement, etc. were selected to display a pattern in which the number of radial elements 11 doubled each time the diameter of outer portion 23 doubled. This is not, however, a requirement in fabricating assembly 1. For example, a larger diameter for hub 2 employed with the above pattern would only have an impact on or effect the circumferential spacing 31A between radial elements 11 at the surface of hub 2. If it is desired as a result of design, calculations, and material selection to change the degree of anisotropic property characteristics of assembly 1, radial elements 11 can be added at diameters of assembly 1 either larger or smaller then indicated in our example. Further, any number or quantity of elements may be added at any level of the diameter to increase strength and stiffness of assembly 1.

Figure 9:
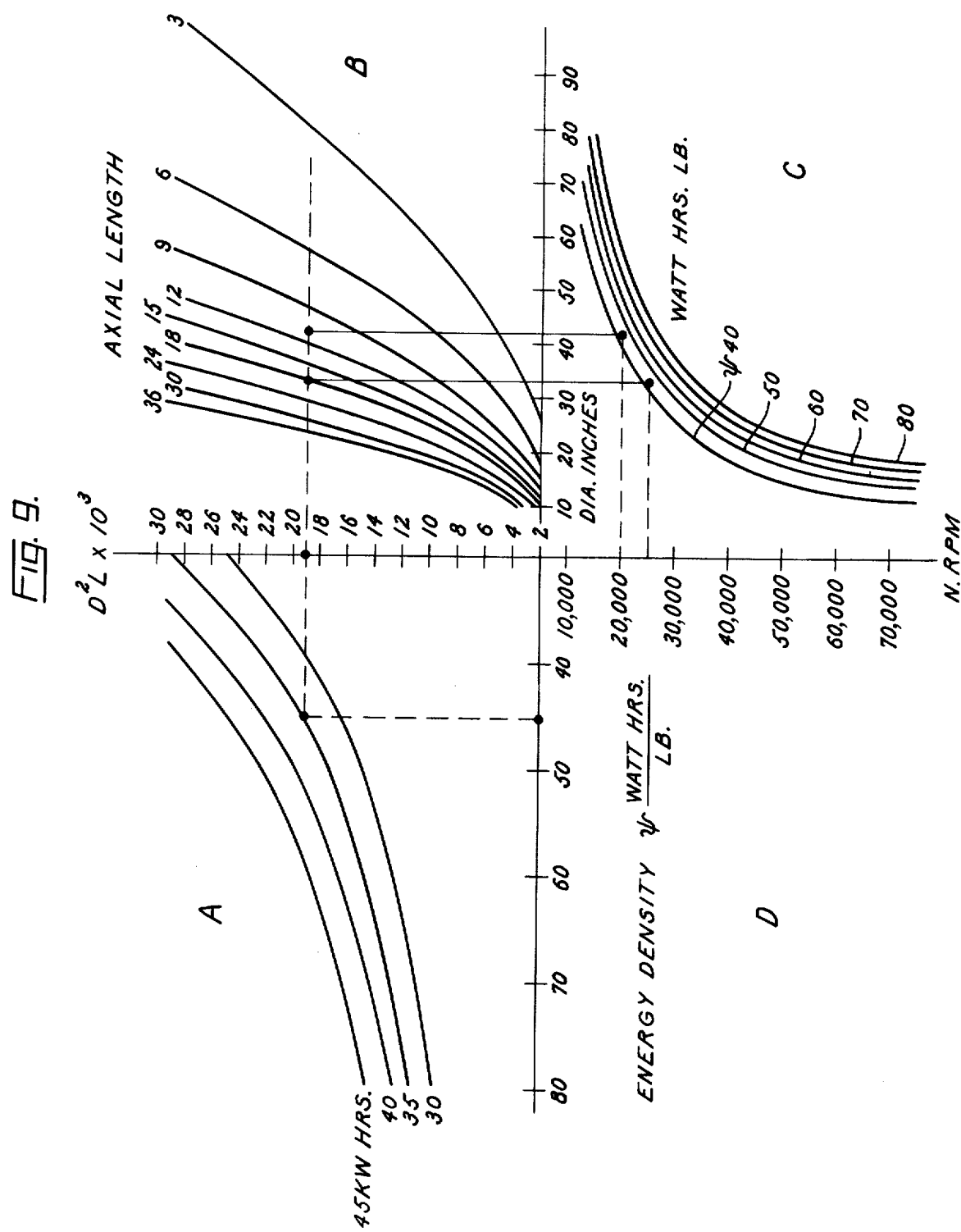
FIG. 9 illustrates design curves for sizing the polar weave assembly of FIG. 3.

In sizing assembly 1 for a particular application, polar weave design curves similar to those shown in FIG. 9 may be used to obtain the desired values of: total energy stored, energy density, diameter, axial length, weight, and RPM.

For example, consider a problem where one wishes to store 35 killowatt hours of energy in assembly 1 while using an energy density of 45 watt hours/pound as a desired efficiency level. Then a specified diameter and length can be determined for 35 killowatt hours of energy in outer portion 3 with curves A. The length and diameter of assembly 1 are determined from curves B and C after a desired operating speed (RPM) is selected. Upon solving our problem, assembly 1 will have a diameter of approximately 42 inches, a weight of approximately 750 lbs., and a thickness of 10 inches for operation at a maximum speeds approximately around 20,000 RPM.

Assembly 1, as noted earlier, may comprise an outer portion 3 constructed out of any one or combinations of the previously named elements and material types.

However, when outer portion 3, in a preferred embodiment, is constructed from aromatic polyamide fibers (such as PRD- b 49, perhaps better known as Kelvar, the trade name given to PRD-49 by Dupont) energy densities in a range of 40–60 watt hours/pounds are attainable. Notably, Kelvar can store approximately seven times as much energy per unit weight as alloyed steel, and is a high-strength, low-density, lightweight, material which can be spun at a much higher rate than metal flywheels before Kelvar reaches its tensile strength limit.

Many advantage, some earlier mentioned, are obtained by constructing assembly 1 in accordance with the principles of this invention. In summary, they are: assembly 1 has high strength and improved shear capability in all directions; assembly 1 is effective in geometrical configurations and under loading conditions in which the principal stress directions are coincident with a polar coordinate system (notably, these loading conditions and stress directions are typically present in spinning flywheels); the simple geometrical configuration attainable with a polar weave constructed assembly 1 results in efficient packaging and eliminates many dynamic problems found in prior art flywheels; assembly 1 provides a broad spectrum of stiffness, strength and density levels in each R, $\theta$ and Z direction; assembly 1 can be tailored to provide a near uniform stress distribution in a cylindrical parallel-sided constructed outer portion 3; a parallel-sided, cylindrical, polar weave, constructed outer portion 3 provides a near constant stress distribution; assembly 1 has a maximum energy storage capacity not heretofore achievable in typical reinforced composites; assembly 1 is in essence a rigid single integral body over an operating range of frequencies, through which natural modes of vibration in assembly 1 close to operating speed ranges are eliminated; the ability to vary the quantity, size and type of elements and material from which assembly 1 is constructed, as a function of the radius of assembly 1, makes possible an approximate 50% improvement in energy density over uniformly anisotropic prior art flywheels; the controllable and variable non-homogeneous, anisotropic property, characteristics afforded by polar weave composite materials allows higher values for weight and volume efficiency factors than previously obtainable with prior art two-directional composite material flywheels; interface 13 minimizes and eliminates difficult problems of anchoring the outer portion of the flywheel to hub 2, since hub 2 is an integral part assembly 1 that remains with outer portion 3 throughout the entire construction process and use cycles.

Lastly, assembly 1 when constructed in accordance with this novel invention may be utilized for many purposes. A few of these purposes are enumerated in the following list: large poler weave flywheels can be used for storage of energy and electrical power system; smaller polar weave flywheels can be used for propulsion of almost every conceivable type of vehicle; polar weave flywheels can also be used to power torpedoes and power shovels; and they can be further utilized for electrical discharge laser systems and high peak power applications, such as an electric discharge explosive metal forming process.

It will be apparent that it is possible to produce still other embodiments without departing from the scope of the invention polar weave flywheel assembly concept herein disclosed. Accordingly, all matter contained in the above description and in the accompanying drawings should be interpreted as illustrative and not in a limiting sense.

What I claim as new and desire a United States Letters Patent is:

1. A flywheel comprising:
   a. an inner hub; and
   b. an outer composite portion woven in intimate locking engagement with said hub, said composite comprising a plurality of three mutually orthogonal bundles of elements with said bundles of elements being respectively aligned and positioned in directions parallel to polar coordinate axis.

2. A flywheel in accordance with claim 1 wherein the ratios of the axial, circumferential, and radial compliance of said outer composite portion with respect to one another varies as a predetermined function of the radius.

3. A flywheel comprising:
   a. an inner hub including a plurality of intersecting projections and recesses;
   b. a cylindrical, configured, outer portion which comprises a three-dimensional reinforced anisotropic composite material, and said composite comprising a plurality of three mutually orthogonal bundles of elements with said bundles being respectively aligned and positioned in directions parallel to polar coordinate axes, and wherein ratios of axial, circumferential and radial compliance with respect to one another vary as a predetermined function of radius of said flywheel to provide adequate strength, stiffness and density levels to accommodate stress distributions in directions of said axes, and to both prevent delamination from occuring in directions along said axes and in directions of stresses acting on said flywheel; and
   c. an interface located between said hub and said composite and wherein said interface mechanically embeds said elements of said bundles into locking engagement with said intersecting recesses and projections.

4. A flywheel as recited in claim 3 wherein said recesses are circular and axial slots.

5. A flywheel as recited in claim 4 wherein said inner hub is tubular.

6. A flywheel as recited in claim 5 wherein said outer portion is parallel sided.

7. A flywheel as recited in claim 6 wherein said projections are lands.

8. A flywheel as recited in claim 7 wherein said recesses are helical and axial slots.

9. A flywheel as recited in claim 8 wherein said elements are aromatic, polymide fibers in an epoxy resin matrix.

10. A flywheel as recited in claim 7 wherein said elements are graphite fibers in an epoxy resin matrix.

11. A process for constructing a flywheel assembly wherein an inner hub is machined for attaching to an outer cylindrical portion comprising:
    a. directly embedding and weaving a three-dimensional reinforced composite matrix of three classes of mutually orthogonal elements, respectively aligned in directions parallel to polar coordinate axes, into a plurality of recesses and projections of said hub to effect an interface between said hub and said outer portion of sufficient strength to withstand failure when subjected to external and internal forces associated with operation of said assembly;
    b. sequentially adding and weaving successive layers of different ones of said three classes of elements about said interface until said outer portion has a cylindrical configuration of a desired size, and wherein said outer portion of said assembly nearly uniformly distributes stress throughout said assembly when subjected to said forces and prevents delamination from occurring in directions of said forces acting on said assembly; and
    c. providing each said three classes elements with a desired compliance in order to provide said flywheel with adequate strength, stiffness and density levels to: accommodate forces acting in directions of said axes, prevent delamination from occurring in directions along said axes, and uniformly distribute internal stresses throughout said assembly.

12. A process for constructing a flywheel assembly as recited in claim 11 further comprising:
    a. varying ratios of said compliance with respect to a predetermined radius of said outer portion in order to control, alter and optimize said internal stresses developed throughout said assembly.

13. A process for constructing a flywheel assembly as recited in claim 12 wherein said three classes of elements are resin impregnated bundles of circumferential, axial and radial fibers, and wherein said three classes of elements reinforce said assembly in said directions by which said internal stresses in said assembly are said controled, distributed and optimized.

14. A process for constructing a flywheel assembly as recited in claim 13 wherein the step of varying the ratios of said compliance is performed by:
    a. varying the material, number and size of any one of said bundles of circumferential, axial or radial fibers with respect to said radius of said outer portion to provide said outer portion with non-homogenous, anisotropic elastic, property characteristics, wherein said anisotropic characteristicsenable said internal stresses to be tailored to obtain said control, stress distributions, high strength, stiffness, and density levels for any particular design of said assembly.

15. A process for constructing a flywheel assembly as recited in claim 14 wherein said recesses are circular and axial slots and said projections are lands.

16. A process for constructing a flywheel assembly as recited in claim 15 further comprising:
    a. positioning and weaving said radial fibers into locking engagement with said hub and said circumferential fibers by drawing, embedding, and locking said radial fibers into said circular slots with a first layer of said circumferential fibers;
    b. positioning and weaving said circumferential threads into locking engagement with said hub and said radial fibers by wrapping, embedding, and locking said first layer of circumferential fibers into and about said circular slots until a top surface of said first layer of said circumferential fibers reaches a base of said axial slots;
    c. positioning, weaving, and embedding said axial fibers into locking engagement with said hub and said circumferential and radial fibers by filling said axial slots with said axial fibers.
    d. completing said interface by securing said axial fibers into said axial slots and among said radial fibers with additional wraps of said circumferential fibers, and wherein said completed interface is an integral part of said outer portion.

17. A process for constructing a flywheel assembly as recited in claim 16 wherein said recesses are helical and axial slots and said projections are lands.